J. B. SMITH.
BROOM CORN CLEANING MACHINE.
APPLICATION FILED APR. 5, 1918.
1,438,192.
Patented Dec. 12, 1922.
5 SHEETS—SHEET 1.
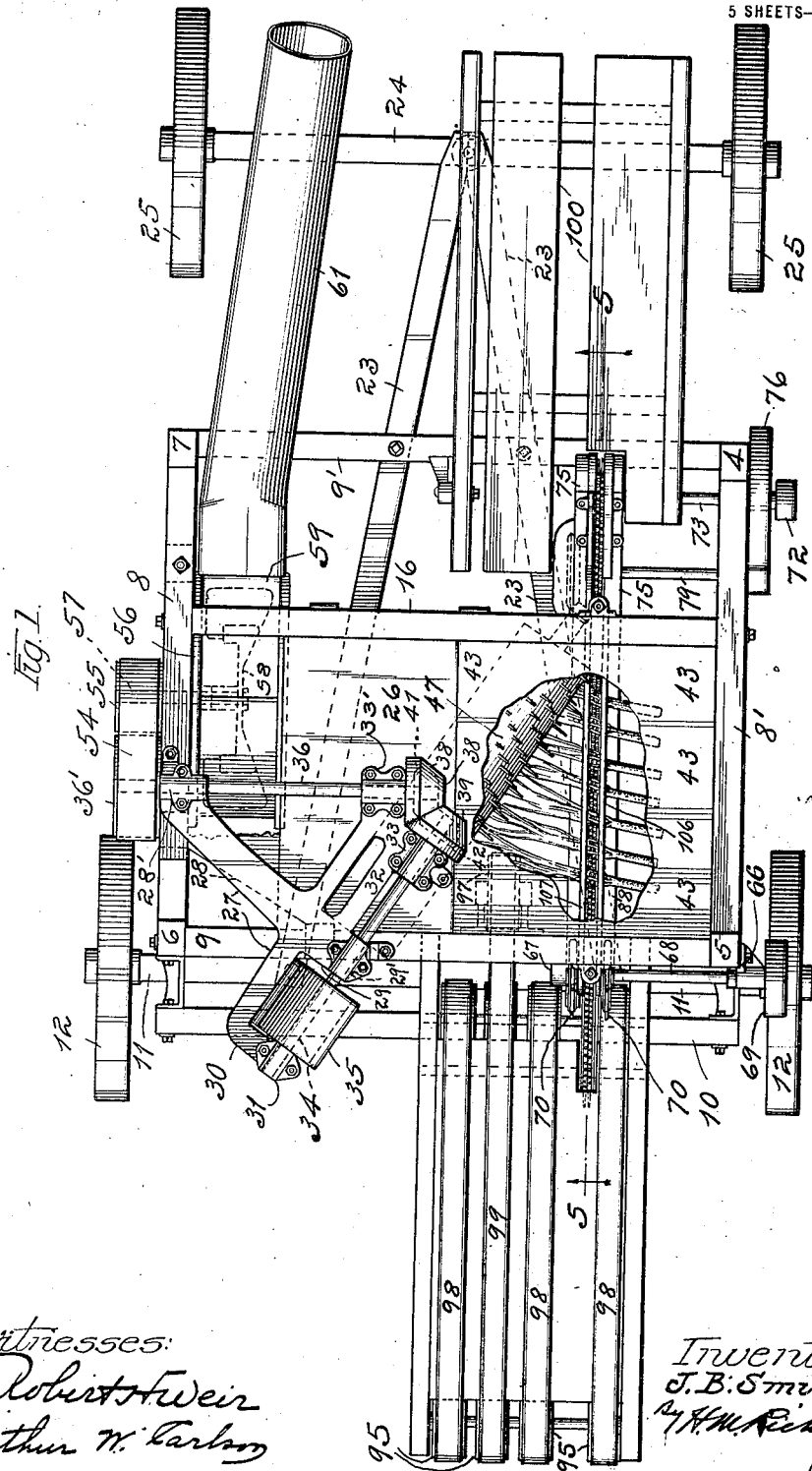

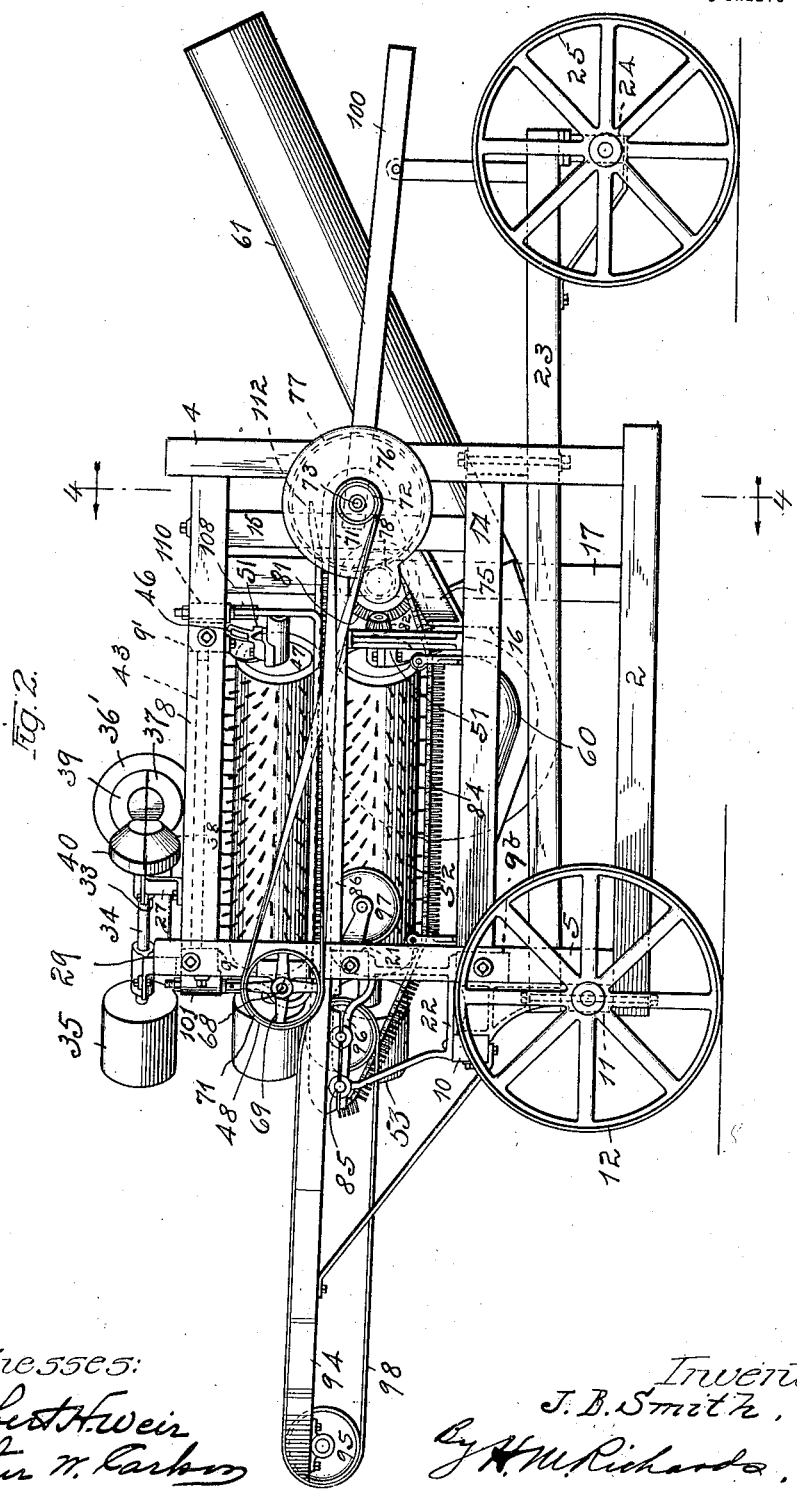

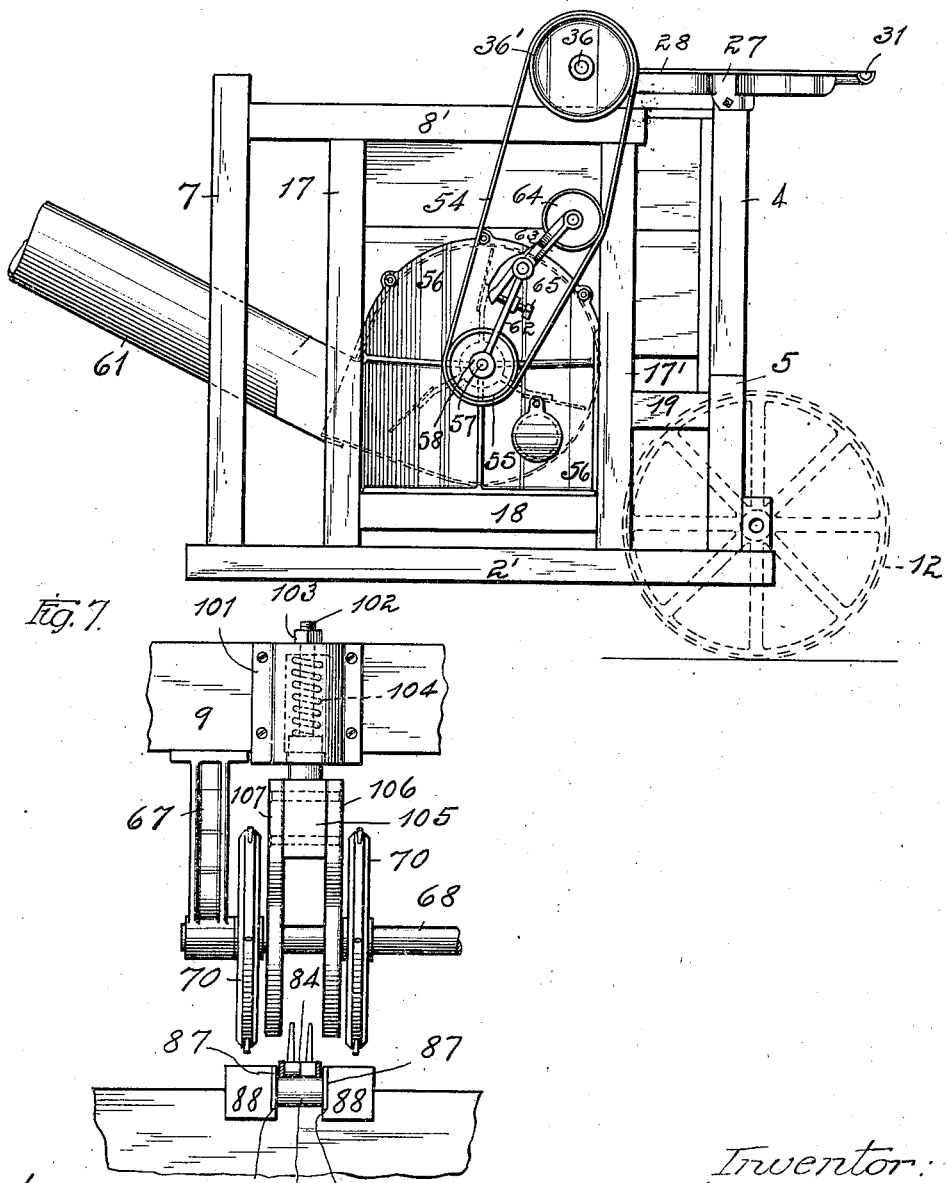

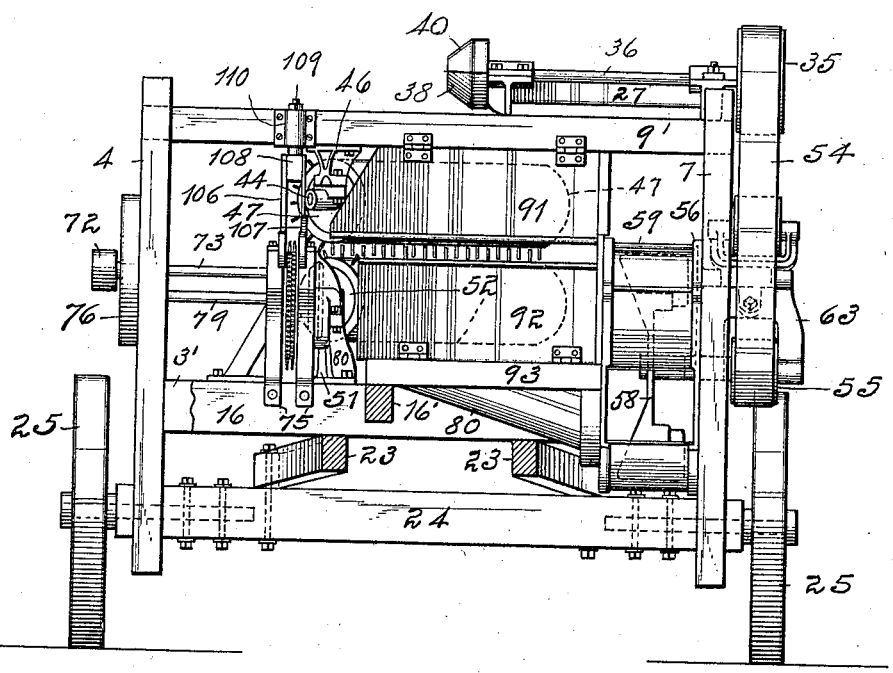
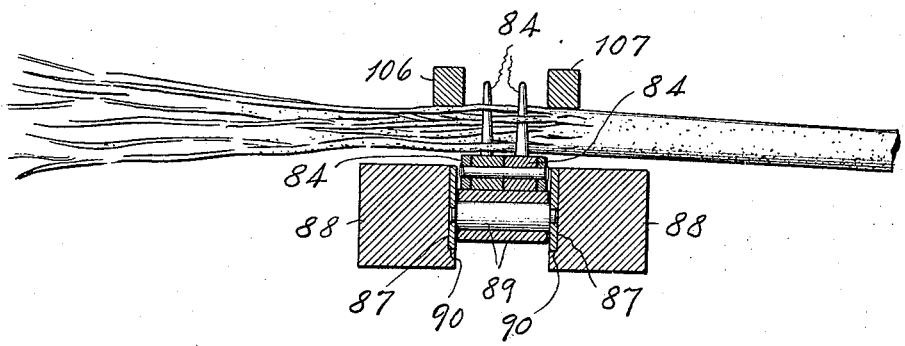

J. B. SMITH.
BROOM CORN CLEANING MACHINE.
APPLICATION FILED APR. 5, 1918.
1,438,192.
Patented Dec. 12, 1922.
5 SHEETS—SHEET 5.
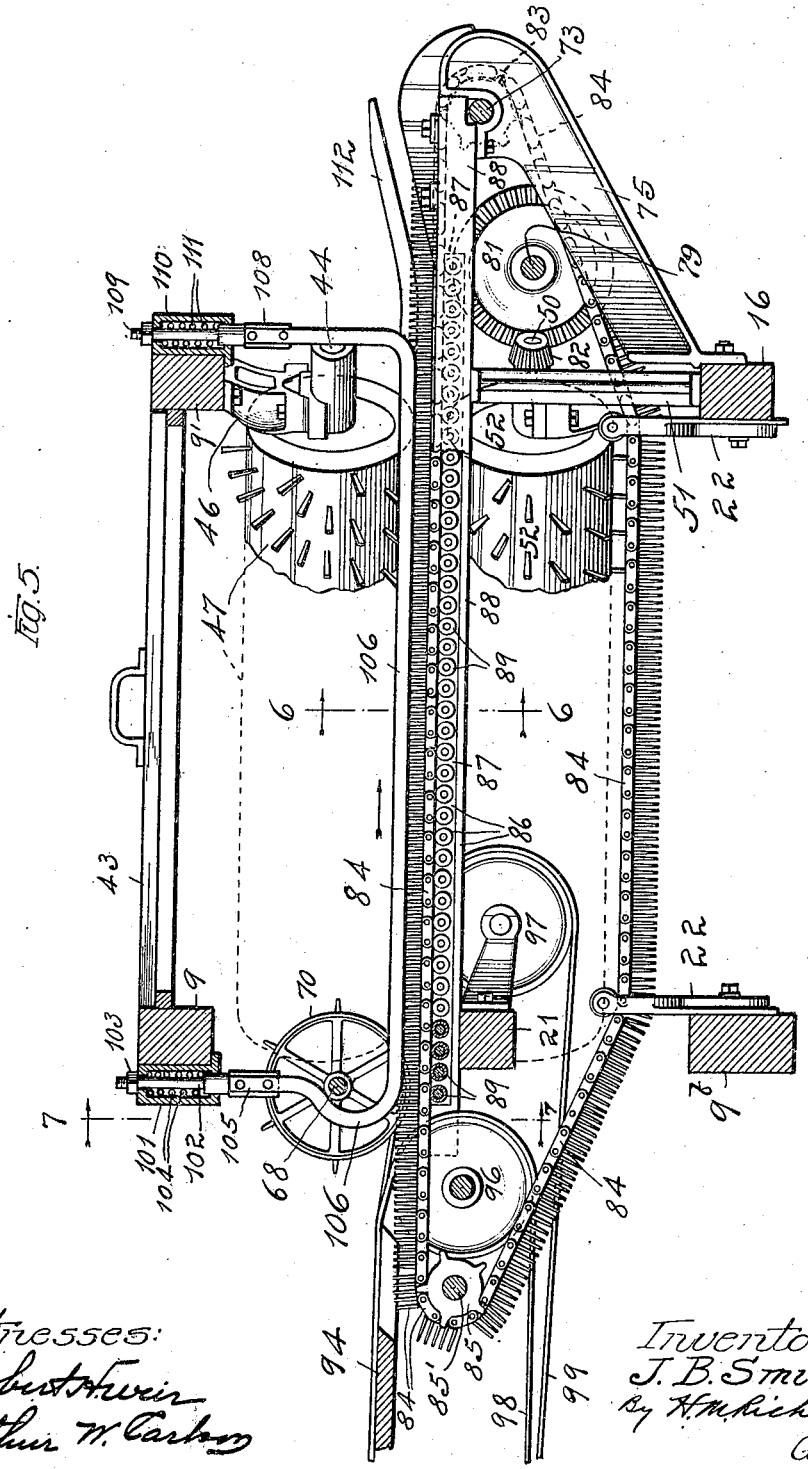

Patented Dec. 12, 1922.

1,438,192

UNITED STATES PATENT OFFICE.

JOHN B. SMITH, OF GALESBURG, ILLINOIS, ASSIGNOR TO SHAW-WELSH & COMPANY, OF GALESBURG, ILLINOIS, A CORPORATION OF ILLINOIS.

BROOM-CORN-CLEANING MACHINE.

Application filed April 5, 1918. Serial No. 226,868.

*To all whom it may concern:*

Be it known that I, JOHN B. SMITH, a citizen of the United States, and resident of Galesburg, in the county of Knox and State of Illinois, have invented a new and useful Broom-Corn-Cleaning Machine, of which the following is a specification.

My invention relates to that class of machines which remove the seed, boots, etc., from broomcorn stalks, in order to place them in suitable condition for making into brooms.

The problem in such machines is to subject the broomcorn to cleaning action to remove its seeds and any sand or dirt which may be adhering to the stalks without breaking or injuring the latter.

For this purpose machines have been constructed in which the broom corn is passed in a longitudinal direction through the machine by means of a toothed chain whilst the broomcorn is combed free of seeds by obliquely arranged cylinders. In some machines the chain was arranged to pass over a channeled member or track. On this member or track dust, sand, and other grit collected with the result that the grinding friction soon wears out the chain links. This is an important factor since broomcorn grows almost exclusively in sandy soil so that the amount of sand shaken off onto the chain and its track is very considerable. It has also been proposed to support the chain by a series of rollers but the latter were arranged so that sand would soon wear out the bearings of the rollers.

The seeds removed from the broom corn are very sticky and tend to adhere to the casing so that preferably means are provided for catching and immediately removing the seeds thrown off by the deseeding cylinders or other devices.

The operator places and spreads the stalks in a layer on the feed chain as evenly as possible, but the layer will vary constantly in thickness. It has been suggested to employ a pressure bar to press the stalks down between the teeth of the feed chain, in order that the latter shall grasp and propel it while it is being acted on by the deseeding means.

When this bar has been resiliently mounted it is provided with only a single spring so that it tends to oscillate with the result that the stalks leaving the presser bar are apt to be subjected to excessive pressure and be thereby broken or injured. Further, the stalks leaving the presser bar have to be lifted off the teeth of the feed chain so that the pressure of the presser bar at its rear end should only be sufficient to prevent premature separation of the stalks from the teeth. At the front end of the presser bar much greater pressure must be exerted to force the teeth through the layer of superimposed broom corn stalks. It is desirable therefore to provide means for producing a difference in pressure at the two ends of the presser bar and for varying such pressures independently of each other.

One of the objects, therefore, of the present invention is to provide a feed-chain track which will not retain grit and which will greatly reduce the friction and consequent wear on the chain.

Another object of the invention is to provide means for catching and substantially immediately removing the seeds thrown from the deseeding cylinders or other devices.

A further object of the invention is to provide means for yieldingly pressing downwards the two ends of the presser bar with different and independently adjustable pressures.

The driving shafts and gear of machines of this character are run at high speed and as a portion thereof is of necessity a bevel-gear there is a constant jarring and torsional strain imposed upon it, causing the machine to run heavily and the gear soon to be replaced. To provide a unit-casting for the bearings of the shafting, and to include in it gear-housings which prevent entrance of dust, sand, chaff and other friction-creating foreign substances constitutes another object of the invention.

Necessarily machines of this nature are relatively large. It is of extreme desirability that they be made as compact as is possible. A fan is included in all such machines. So far as my knowledge extends this and its casing have heretofore been positioned exterior to the frame. This necessitated a somewhat long chute within the frame within which the sticky seeds were apt to stick and collect. The fan and the casing were liable to become injured or even knocked from the frame, and they occupied much space. To dispose the fan and its casing wholly within the frame in such a position that the great majority of the seeds from the deseeding cylinders are thrown by the latter into the intake of the fan constitutes another object of the invention.

In order to prevent the chaff and dust from rising and floating toward the operator it has been customary to secure a cover upon the top of the machine. In some ways this has been objectionable, for the cover prevented access to many parts of the mechanism. To provide a removable cover, and to make it in sections, whereby access may be had from above to any of the upper parts of the mechanism, is another object of the invention.

For the purpose of taking away the finished stalks an attendant stands at the rear part of the machine. The dust created by the operations of the machine is apt to impair his vision. In order to prevent this dust from blowing or floating toward him it has been customary to cover the rear end of the main frame with boards. These, until removed, have prevented access to the interior. To provide hinged covers for the rear end of the frame, which, while preventing the escape of dust yet permit of the greatest accessibility to the machinery near them, constitutes another object of the invention.

In order to attain the greatest efficiency it is absolutely necessary to keep the mechanical parts of the machine as free as possible from dust, sand, chaff, etc., to keep them in constant repair, and to keep them well oiled. Owing to the nature of the material being handled these objectionable matters are present in large quantities. Another object of the invention is to so arrange the various elements of the machine that each thereof is easily accessible for repair, cleaning and oiling constitutes still another object.

Several minor objects will appear. Some of these will be obvious and others particularly pointed out.

In the accompanying drawings:

Figure 1 is a top plan, partly broken away;

Fig. 2, a side elevation;

Fig. 3, an elevation of the principal parts at the left hand side of the machine;

Fig. 4, a transverse section on the line 4—4 of Fig. 2;

Fig. 5, an enlarged sectional detail on the line 5—5 of Fig. 1;

Fig. 6, an enlarged sectional detail on the line 6—6 of Fig. 5; and

Fig. 7, an enlarged front detail elevation, partly in section, taken in the plane of the line 7—7 in Fig. 5.

Coming now to a detailed description of the drawings, in which the same numeral uniformly refers to the same part, 2, 2' indicate the lower side-bars, 3, 3' lower cross-bars, 4, 5, 6 and 7, the posts, 8, 8' the upper side-bars, and 9, 9' the upper cross-bars of the main frame of the machine. 10 designates a supporting-bar and 11 the front axle on which are mounted supporting-wheels 12. 14 indicates a longitudinal frame-bar disposed between the bars 4 and 5, and 15 is a standard rising from the bar 14 and bolted to the bar 8. 16 denotes a central, transversely arranged supporting-bar, its outer portion secured to the bar 14 and its inner end to a longitudinal centrally disposed bar 16' as best shown in Figure 3. 17, 17' denote vertically arranged supporting-bars secured to the frame-bars 2' and 8', and 18 is a connecting-plate between them. 19 is a short plate disposed between the uprights 4 and 17'. 21 is a cross-bar secured to and supported on brackets 22 secured to the bars $9^b$ and 10.

23, 23 denote draft-bars the divergent ends of which are secured to the axle 11 and the meeting ends of which are pivotally connected with the front axle 24. 25, 25 denote the front wheels.

26 indicates a heavy top-piece. Firmly secured thereto is a unitary bearings-casting 27 having an arm or branch 28 secured to the bar 8, an arm 29 secured to the bar 9, and an extension or projection 30 having a bearing 31. The arms 28 and 29 are provided with bearings 28' and 29' respectively, and that arm, 32, of the casting which is secured to 26 is provided with a double bearing 33, 33' arranged for a bevel-gear. The main drive shaft 34 is mounted in the bearings 29', 31 and 33 and on it is secured the main drive pulley 35. A transmission sheave or pulley 36' is secured on a shaft 36 mounted in the bearings 28 and 33'. The lower half of the branch 32 has integral half-cone cup-like terminals 37 and 38 which receive the bevel-gear, (presently described,) and a half-cone cover 39, 40 respectively is secured thereover after the gear-wheels have been positioned, whereby to provide an effective means for excluding dust, sand, and other foreign matter. Bevel gear wheels 41, 42 are secured respectively on the shafts 36 and 34.

43 denotes a top which normally covers the large opening above the feed-chain and cylinders, but which is removably held in any suitable manner in order that access may readily be had to said operative parts. When in position it prevents chaff and the like flying upwardly and floating forwardly to the operator.

The cross bar 21 carries a bearing for one end of a shaft 44 the other end of which is mounted in a bearing in a bracket 46 secured to and depending from the bar 9' (see Figure 5). The usual toothed upper deseeding or combing cylinder 47 is fixed on said shaft, and on the outer end of the latter is a belt-wheel 48. Fixed to the cross bar 21 is a bracket provided with a bearing for one end of a shaft 50 the other end of which is mounted in a bearing in a bracket 51 secured on the bar 16. The usual toothed lower deseeding cylinder 52 is fixed on said shaft 50, as is also a sheave or belt-wheel 53. A belt (not shown) which traverses the sheave 35 and derives motion from any suitable source, traverses also, but on opposite sides of, the sheaves 48 and 53 whereby to drive them in contrary directions, in the usual manner.

The sheave 35 drives the shaft 34 and thereby the bevel gear 41—42 to thereby drive the shaft 36 and wheel 36'. A belt 54 embraces and is driven by said wheel 36' and transmits motion to a sheave 55 fixed on the outer end of a shaft 57 having a bearing in a heavy casting 56 which constitutes the outer plate of the fan-casing and which is disposed between and secured to the standards 17 and 17', see Fig. 3. The hub of the fan 58 is fixed on said shaft. 59 indicates the fan-drum or casing, and 60 a chute disposed beneath the toothed cylinders and adapted to deliver the chaff, boots, seed, etc., into the fan-drum from whence it will be blown into the usual spout 61.

It is to be noted that the entire fan-casing is arranged within the main frame and that none of its parts project whereby they are liable to become disabled, and further whereby the entire machine may be either stored or operated on a much smaller floor space than heretofore.

62, 63, 64 and 65 (Fig. 3) designate respectively the arm, adjusting lever, belt-stretcher (or idler) and adjusting screw of a well known device for which no novelty is herein claimed.

66 denotes a bearing-bracket secured to the post 5, and 67 a similar one secured to the bar 9. In these is mounted a shaft 68 on which is fixed a drive-pulley 69. Also fixed on said shaft is a pair of presser-wheels 70 arranged on opposite sides of the feed-chain presently described. The pulley 69 is embraced by a crossed-belt 71 which is driven from a belt-wheel 72 on a shaft 73 mounted at its outer end in a bearing secured between the posts 4 and 15 and at its inner end in a bearing in a pair of like brackets 75 running diagonally upwardly and rearwardly from the bar 16. Disposed within a housing 76 and fixed on the shaft 73 is a spur-wheel 77 which drives a pinion 78 also within said housing and fixed on a shaft 79 seated at its outer end in a bearing formed in said housing, the inner end of the shaft having a bearing in an arm projecting from a bracket 80 fixed to the bar 16. On the inner end of the shaft 79 is a bevel spur 81 driven by a bevel driving-pinion 82 fixed on and driven by the shaft 50.

Fixed on the shaft 73 is a sprocket-wheel 83 (Figure 5) which engages and drives the links of a toothed endless feed-chain 84 the forward end of which runs over a sprocket wheel 85 on a shaft 85' having bearings in the brackets 22. The upper or feed-flight of the chain runs in a horizontal plane on a track 86 constructed as follows: A pair of parallel plates 87 are seated each on the shoulder of a rabbet in the adjacent edges of a pair of parallel bars 88 supported at their rear ends on and secured to the upper ends of the brackets 75, as shown best in Fig. 5, and their front ends resting on and secured to the bar 21. Each plate 87 is provided with a longitudinal series of apertures, in the registering pairs of which are mounted the gudgeons of a plurality of rollers 89. The plates 87 may be secured to the bars 88 in any suitable manner, the rabbetted shoulders 90 and the sides of the bars constituting a support which holds the plates from either lateral or vertical movement. The rollers are spaced sufficiently apart to permit sand, grit, dust, etc., from collecting and thereby quickly wearing out the chain.

91 indicates a shield hinged to the bar 9', and 92 denotes a shield hinged to a plate 93 supported between the inner head of the fan-casing and the bar 16'. Said shields are normally spaced slightly from each other in order to permit the egress of the broom-corn stalks, and should an unusually large charge of stalks pass to them they will yield readily to permit it to pass. Also they serve effectually to prevent the chaff flying onto the operator at the rear end of the machine.

At the front end of the machine are the feedtable 94, belt-wheels 95, 96 and 97, and belts 98 and 99. These being common in machines of this character, and not appearing as elements of my invention, they need no detailed description herein.

At the rear end of the machine is the usual discharge-table 100, which also requires no detailed description.

Secured to the cross-bar 9 is a spring-box 101. Through it runs a staff or plunger 102 the upper end of which is threaded and engages a nut 103 resting on top of the box. An expansion spring 104 embraces the staff, its upper end taking against the top of the box and its lower end resting on an annular shoulder on the staff. 105 designates a head to which the staff is rigidly secured. The forward vertical branches of a pair of parallel pressure-bars 106, 107 (which stride the feed-chain) also are secured to the head 105. The rear terminals of the bars 106, 107, are secured to a head 108 to which is fixed a staff 109 adapted to reciprocate in a spring-box 110 and embraced by an expansion spring 111 arranged within the box. 112 designates a guard arm secured to and projecting rearwardly from the arm 107 and adapted to prevent the operator from being injured by the rear flight of the chain 84. Heretofore, if an unusually large bunch of broomcorn happened to pass to and beneath the arms 106 and 107 there was danger not only of clogging the machine but also of breaking the teeth of the feed-chain. This danger is eliminated by the employment of the above described means, for if an uncommonly large charge is permitted to pass beneath the arms 107, 108 the springs 104 and 111 will yield and permit the charge to be carried along without injury to any part of the machine. Instantly upon the excess charge of material having passed from beneath the arms the springs will expend their stored energy and restore them to normal positions.

The operation is as follows:

The broomcorn stalks are placed by the operator on the travelling belts 98 and 99, with their butts pointing to the right. These belts carry the stalks along until they are engaged by the rotating presser wheels 70, by which they are pressed down into engagement with the pins on the endless chain 84 and simultaneously brought under the presser-bars 106.

The chain 84 then carries the stalks past the rotating deseeding cylinders 47 and 52, by which they are cleaned. The stalks then pass out between the hinged doors 91 and 92 onto the discharge table 100.

Having thus described my invention I claim as new the following, to-wit:

1. In a broomcorn machine, a frame, deseeding cylinders mounted in bearings thereon, a feed-chain for delivering material thereto and carrying it therefrom, an upper, downwardly swinging guard-door hinged to an upper bar of the frame, and a lower, upwardly swinging guard-door disposed below and spaced from the door above recited and hinged to a lower frame-bar, the material passing from said chain and cylinders adapted to pass through the space between the doors and the doors adapted to yield to permit an excess charge of material to pass.

2. In a broomcorn machine, a frame, cleaning and feeding devices disposed within it, a removable top-section forming a shield above the feeding and cleaning devices, a fan-case forming a shield at one side of the cleaning devices, and a pair of doors forming shields at the rear of the cleaning devices.

In testimony whereof I hereunto sign my name this 25th day of March, 1918, at Galesburg, Knox County, Illinois.

JOHN B. SMITH.